(12) United States Patent
Dellmann et al.

(10) Patent No.: US 9,030,779 B2
(45) Date of Patent: May 12, 2015

(54) TAPE HEAD WITH TAPE-BEARING SURFACE EXHIBITING AN ARRAY OF PROTRUDING TOPOGRAPHIC FEATURES

(71) Applicant: International Business Machines Corporation, Armonk, NY (US)

(72) Inventors: Laurent A. Dellmann, Birmensdorf (CH); Johan B. C. Engelen, Zurich (CH); Vara Sudananda Prasad Jonnalagadda, Waedenswil (CH); Mark A. Lantz, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/295,633

(22) Filed: Jun. 4, 2014

(65) Prior Publication Data

US 2014/0368953 A1 Dec. 18, 2014

(30) Foreign Application Priority Data

Jun. 12, 2013 (GB) .................................. 1310445.0

(51) Int. Cl.
G11B 15/60 (2006.01)
G11B 5/187 (2006.01)
G11B 5/255 (2006.01)

(52) U.S. Cl.
CPC ..................................... *G11B 5/255* (2013.01)

(58) Field of Classification Search
USPC .......... 360/122, 130.21, 221, 291; 242/615.2; 428/810
See application file for complete search history.

(56) References Cited

U.S. PATENT DOCUMENTS

| | | | | |
|---|---|---|---|---|
| 5,636,092 A | * | 6/1997 | Nasu et al. | 360/122 |
| 6,700,743 B2 | * | 3/2004 | Fahimi et al. | 360/137 |
| 6,927,937 B2 | * | 8/2005 | Aoki | 360/122 |
| 7,163,175 B2 | | 1/2007 | Bloomquist et al. | |
| 7,589,928 B2 | * | 9/2009 | Roy et al. | 360/75 |
| 8,009,386 B2 | * | 8/2011 | Hachisuka | 360/122 |
| 2009/0027812 A1 | | 1/2009 | Noguchi et al. | |
| 2009/0174967 A1 | * | 7/2009 | Biskeborn et al. | 360/313 |

(Continued)

FOREIGN PATENT DOCUMENTS

| | | |
|---|---|---|
| JP | H0845015 A | 2/1996 |
| JP | 2010079968 A | 4/2010 |

OTHER PUBLICATIONS

IBM, [online]; [retrieved on Mar. 27, 2014]; retrieved from the Internet http://www.zurich.ibm.com/news/10/storage.html IBM Research-Zurich, "IBM Research Sets New Record in Magnetic Tape Data Density," Jan. 2010, pp. 1-2.

(Continued)

*Primary Examiner* — Brian Miller
*Assistant Examiner* — Carlos E Garcia
(74) *Attorney, Agent, or Firm* — Cantor Colburn LLP

(57) ABSTRACT

A tape head, adapted for reading and/or writing to a magnetic tape, has a tape-bearing surface and is configured to urge a magnetic tape against the bearing surface, in operation. The bearing surface includes a transducer area, having at least one transducer that is a read and/or write element, designed for reading and/or writing to a magnetic tape, and a structured area adjacent to the transducer area, comprising a periodic array of topographic features, the topographic features configured within the structured area to determine a minimal distance between the transducer area and a tape.

13 Claims, 6 Drawing Sheets

(56) References Cited

U.S. PATENT DOCUMENTS

| | | |
|---|---|---|
| 2009/0231757 A1 | 9/2009 | Biskeborn et al. |
| 2011/0059336 A1* | 3/2011 | Biskeborn et al. ............ 428/810 |
| 2011/0181982 A1* | 7/2011 | Yano .............................. 360/90 |
| 2012/0300338 A1 | 11/2012 | Biskeborn |

OTHER PUBLICATIONS

UK Intellectual Property Office, Application No. GB1310445.0; Patents Act 1977: Search Report under Section 17(5); Mailed: Dec. 5, 2013; pp. 1-4.

* cited by examiner

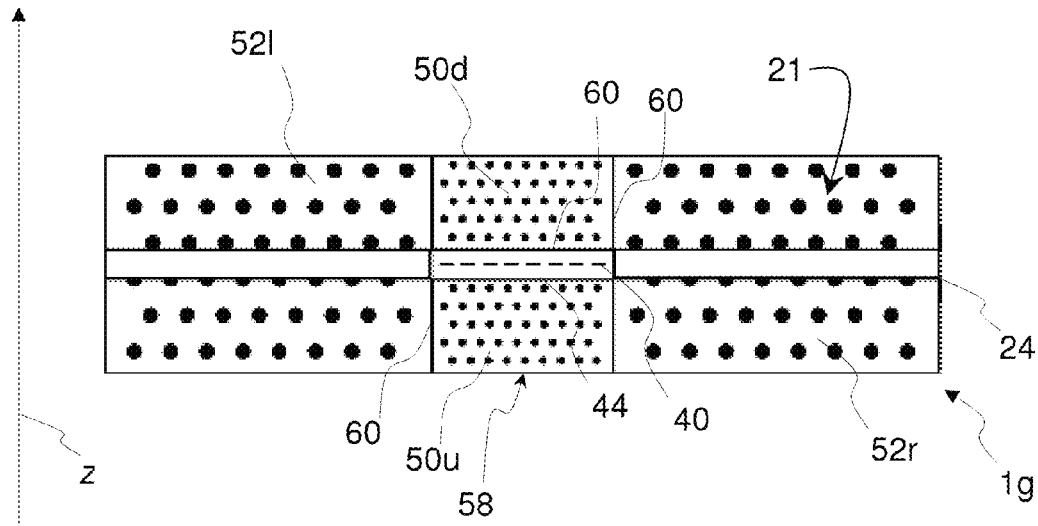
FIG. 11
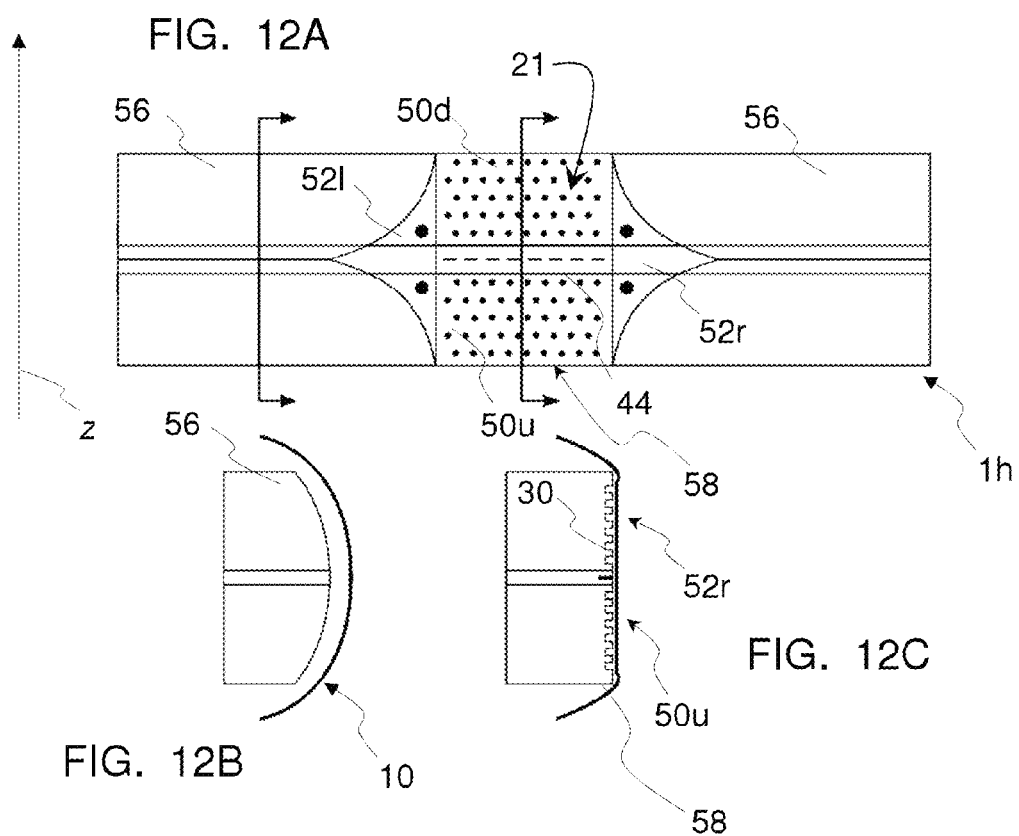
FIG. 12A
FIG. 12B
FIG. 12C

TAPE HEAD WITH TAPE-BEARING SURFACE EXHIBITING AN ARRAY OF PROTRUDING TOPOGRAPHIC FEATURES

PRIORITY

This application claims priority to Great Britain Patent Application No. 1310445.0, filed Jun. 12, 2013, and all the benefits accruing therefrom under 35 U.S.C. §119, the contents of which in its entirety are herein incorporated by reference.

BACKGROUND

The invention relates in general to the field of tape heads for reading and/or writing to magnetic tapes, whose tape-bearing surface is treated or configured to minimize friction. It relates in particular to tape heads exhibiting protruding features to reduce friction and stiction.

To write and read at the high areal densities used by modern tape systems, the magnetic tape has to be in close proximity to the read/write elements on a tape read/write head. Research efforts are spent to arrive at a viable solution to reduce the distance between the tape and the head, in operation, as reducing this spacing allows for increasing the areal density.

When a tape is streamed over a surface an air bearing forms, which prevents the tape from coming in close contact with the head. As a result, the achievable tape-head distances can not reach the nanometer-range. A solution that was developed and that current tape heads typically use is to rely on skiving (i.e., sharp) edges to scrape off (skive off) the air. This forms a low pressure region directly after the skiving edge, such that the tape is pushed into intimate contact with the tape head, due to the higher air pressure on the opposite side of the tape. An advantage of this solution is that the tape-head spacing is small and stable over a wide range of tape speeds. A disadvantage is the friction and wear that arise due to the direct contact. To prevent excessive friction, the tape is intentionally made rough, i.e., with sporadic bumps on the tape surface so that only a fraction of the tape surface is in actual contact with the tape-bearing surface of the head. Effectively, these bumps increase the tape-head spacing. Now, to increase the linear density, one may seek to reduce the tape-head spacing by using a smoother tape. However, using a smoother media results in an increased friction that can degrade the recording and read back performance of the tape drive. In extreme cases, friction can even cause the tape drive motors to stall and tape breakage.

In the neighboring field of hard disk drives (HDDs), the magnetic medium is not in direct contact with the read/write head. There is an air bearing between the head and the disk. Because the disk is a rigid surface, the head can be pushed towards the disk to reduce the air bearing thickness such that the disk-head spacing is only a few nanometers, to be compared with, typically, several tens of nanometers for tape media. The non-contact recording in an HDD virtually eliminates head wear, while operating at very small disk-head spacing.

SUMMARY

According to a first aspect, the present invention is embodied as a tape head, adapted for reading and/or writing to a magnetic tape, the tape head having a tape-bearing surface and being configured to urge a magnetic tape against the bearing surface, in operation, wherein the bearing surface includes a transducer area, comprising at least one transducer that is a read and/or write element, designed for reading and/or writing to a magnetic tape, and a structured area adjacent to the transducer area, comprising a periodic array of topographic features, the topographic features configured within the structured area to determine a minimal distance between the transducer area and a tape, in operation.

In embodiments, a ratio of an average sectional area of one of the topographic feature to the area of a primitive cell of the periodic array is less than 20%, preferably less than 1%, and more preferably less than 0.1%.

Preferably, the tape-bearing surface comprises one structured area with topographic features, adjacent to the transducer area along a longitudinal direction of circulation of a tape, whereas the tape-bearing surface does not comprise any structured area with topographic features, or comprises a different structured area having different topographic features, in a region opposite to the one structured area, with respect to the transducer area along the longitudinal direction.

In preferred embodiments, the tape-bearing surface comprises at least two structured areas, each adjacent to a transducer area that comprises at least one transducer, each of the two structured areas comprising a periodic array of topographic features on the tape-bearing surface, a first one of the two structured areas opposite to a second one of the two structured areas with respect to the transducer area, the at least two structured areas preferably distributed along a longitudinal direction of circulation of a tape.

Preferably, the tape-bearing surface comprises at least four structured areas, each adjacent to a transducer area that comprises at least one transducer, each of the four structured areas comprising a periodic array of topographic features on the tape-bearing surface, a first one of the four structured areas opposite to a second one of the four structured areas with respect to the transducer area, the first and the second structured areas distributed along a longitudinal direction of circulation of a tape, a third one of the structured areas opposite to a fourth one of the structured areas with respect to the transducer area, the third and the fourth structured areas distributed along a lateral direction, perpendicular to the longitudinal direction of circulation of a tape.

In embodiments, the topographic features have, on average, a protruding height between 10 and 1000 nm, preferably between 100 and 500 nm.

Preferably, the topographic features have, on average, a cross-sectional area diameter between 100 and 5000 nm, preferably between 200 and 1000 nm.

In preferred embodiments, an average distance between the topographic features is between 1 and 20 micrometers, preferably 2 and 10 micrometers.

Preferably, the tape-bearing surface comprises one or more layers of material deposited on top of features, conformal thereto, to form the topographic features, the one or more layers preferably comprising one or more of the following materials: FeN, TiN, SiN, Diamond-like carbon and aluminum oxide.

In embodiments, at least a subset of the topographic features has an essentially constant cross-section along their height.

Preferably, the topographic features comprise one or more of: TiN, $Al_2O_3$—TiC, and FeN.

In preferred embodiments, topographic features in the structured area are arranged in one or more compartments, each of the compartments comprising an array of topographic features and being enclosed, at least partly, by barriers on the tape-bearing surface.

Preferably, the tape-bearing surface exhibits at least two distinct periodic arrays of topographic features, wherein a first array comprises a first set of topographic features, and a second array that is farther from the transducer area than the first array comprises a second set of topographic features, the first and second sets of topographic features being configured to allow for a tape to get closer to the first array than to the second array, in operation.

In embodiments, the topographic features are connected, defining unconnected empty cells therein, for example such as to form a honeycomb structure.

Preferably, the tape-bearing surface is defined by a flat protruding from a side of the tape-bearing surface so as to come closer to a tape than regions adjacent to the flat, and wherein the head preferably comprises, on the same side and in the vicinity of the flat, beveled regions and/or chamfered regions.

In another embodiment, disclosed is a method of implementing tape head distance control for a tape head, adapted for at least one of reading and or writing to a magnetic tape, the tape head having a tape-bearing surface and configured to urge a magnetic tape against the tape-bearing surface, the tape-bearing surface comprising a transducer area having at least one transducer that is at least one of a read element and a write element, and a structured area adjacent to the transducer area, comprising a periodic array of topographic features on the tape-bearing surface, the topographic features configured within the structured area to determine a minimal distance between the transducer area and the magnetic tape. The method includes circulating the magnetic tape with respect to the tape head by streaming the magnetic tape over the tape bearing surface to form an air bearing between the magnetic tape and the tape bearing surface; sensing, via a thermal sensor circuit, a distance between the tape bearing surface and the magnetic tape; and altering the distance according to a signal received from the sensor circuit.

Devices embodying the present invention will now be described, by way of non-limiting examples, and in reference to the accompanying drawings. Technical features depicted in the drawings are not to scale.

BRIEF DESCRIPTION OF THE SEVERAL VIEWS OF THE DRAWINGS

FIGS. 7, 8, 9, 10, 11, and 12A are simplified representations (top views) of regions of a tape head surrounding a tape-bearing surface, according to various embodiments;

FIGS. 12B and 12C show sectional views of the tape head of FIG. 12A; and

DETAILED DESCRIPTION

Figure 1:
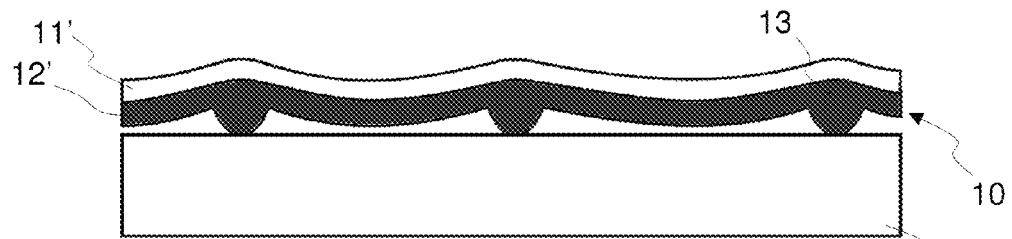
FIG. 1 (prior art) is a 2D cross-sectional view of a simplified representation of a tape streamed over a tape-bearing surface, the tape having sporadic bumps on the tape surface exposed to the bearing surface.

As indicated above, a tape can intentionally be made rough with sporadic 'bumps' 13 on the surface so that only a fraction of the tape surface is in actual contact with the tape head, as depicted in FIG. 1. Effectively, the bumps 13 on the tape prevent small tape-head spacing.

Here, solutions are disclosed that allow for achieving both a low friction with small tape-head spacings. The presented solutions not only reduce friction while tape is running, but also reduces the static friction to start the tape (also called stiction). The word "friction" is herein used to mean both friction and stiction.

In reference to FIGS. 2 to 12, a general aspect of the invention is first described, which concerns a tape head 1, 1a-1h.

To start with, such a head is generally configured for reading and/or writing to a magnetic tape 10. The tape head is further configured to urge the tape 10 against the tape-bearing surface 21, in operation. As usual in the art, the term "tape-bearing surface" denotes that surface coming into close contact with the tape, in operation.

Several possibilities can be contemplated for urging a tape 10 against the bearing surface 21. One known solution is to design the tape head with one or more skiving edges 58 (see FIGS. 7-12), e.g., sharp edges delimitating in full or in part the bearing surface 21. The head may be otherwise structurally configured (e.g., with beveled regions 56 and/or chamfered regions 52l, 52r, etc.) to create a depression about the tape-bearing surface, resulting in pushing the tape against the surface 21, as known in this field. One or more skiving edges 58 and/or other structures 52l, 52r, 56 may accordingly be provided to urge the tape against the surface 21. In alternative embodiments, electrostatic attractors (not shown) are provided, resulting in a comparable effect and possibly allowing for distance control, as to be discussed later in details.

The bearing surface 21 includes a transducer area 44. The latter is equipped with at least one transducer 40, i.e., a read and/or write element, designed for reading and/or writing to a magnetic tape 10, as known per se.

Figure 2:
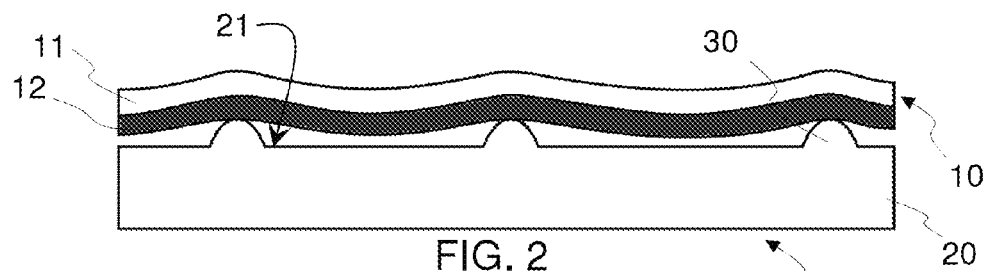
FIGS. 2, 3 and 4 are 2D cross-sectional views, similar to FIG. 1, except that tape-bearing surface exhibits a periodic array of topographic features, configured to determine a minimal approach distance for the tape (that can in turn be smoother), according to embodiments.
Figure 3:
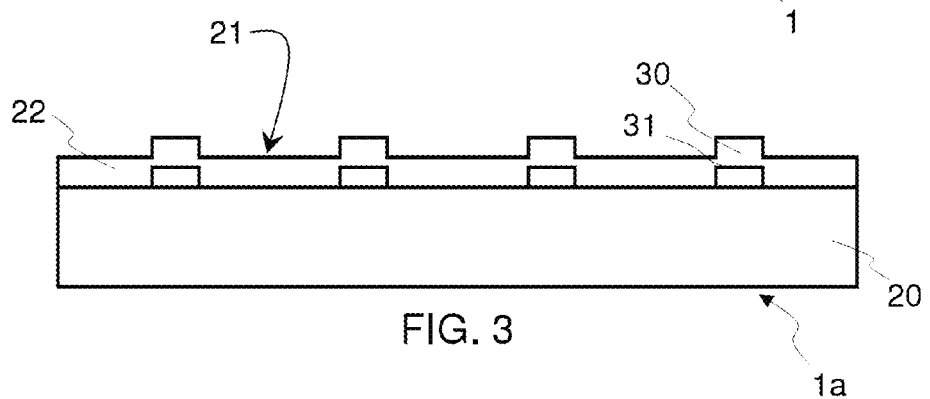
Figure 4:
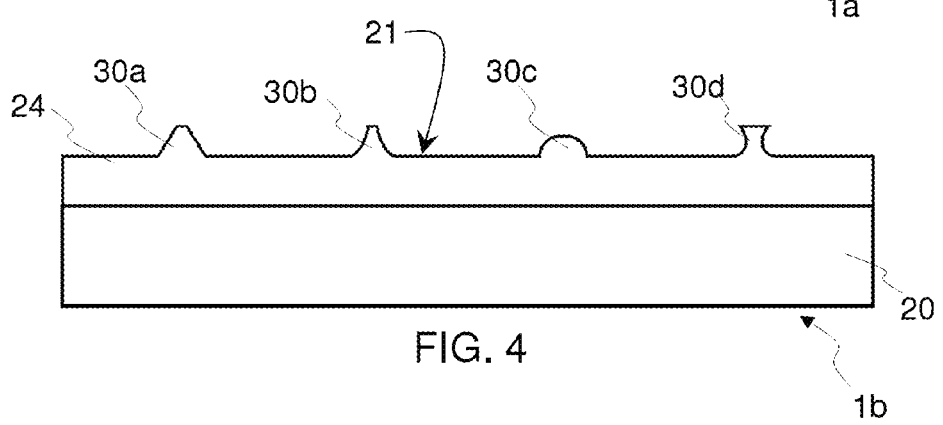

A structured area 50, 52 is provided adjacent to the transducer area 44, which structured area comprises a periodic array of topographic features 30, 30a-30g, that is, on the tape-bearing surface 21. These topographic features are configured within the structured area to determine a minimal approach distance, i.e., a minimal distance between the transducer area and a tape, when streaming the tape over the tape bearing surface 21. There are typically several transducers 40 and several structured areas, each adjacent to one or more transducers. Thus, the area of contact about a transducer is determined by the topographic features. The features 30 protrude from a recessed surface, i.e., the area between the features 30 is recessed, as seen in FIGS. 2-4. The upper surface of the features 30 actually form the tape-bearing surface 21, functionally speaking, and this upper surface may be shaped like any usual tape-bearing surface.

Figure 5A:
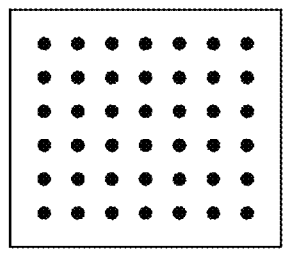
FIGS. 5A, 5B, 5C, 6A and 6B are simplified representations (top views) of patterns of topographic features, as involved in embodiments.
Figure 5B:
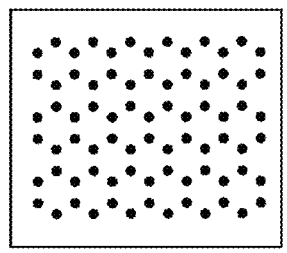
Figure 5C:
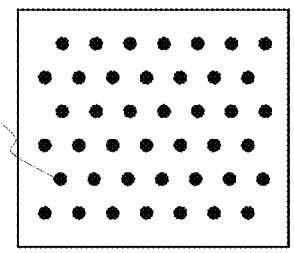

The 2D lattice formed by the features 30 could be e.g., square, honeycomb, etc., as depicted in FIGS. 5-6. Still, a 2D hexagonal lattice (or equilateral triangular lattice) or a parallelogrammic (or oblique) lattice are preferred, as, it can be realized, such lattices are more isotropic in-plane. For a same first-neighbor distance, they would therefore allow for better preventing excessive sagging of the tape.

Instead of having bumps on the media, topographic features can be provided on the head, in regions 50 close to, e.g., adjacent to the transducer area 44. Regions where the tape-spacing should become as small as possible, e.g., transducer areas 44, are preferably free of such features 30 (they may however be provided with smaller features), while relatively large features can be provided in regions 52 where tape-spacing is less important. Note that the structured areas 50, 52 need not be contiguous, i.e., immediately adjacent to a transducer area 44: a small gap (along x and/or z) may be present, as long as the gap and the dimensions of the topographic features still allow for the features 30 to determine a suitable minimal tape-head distance. This gap should preferably be small enough to prevent sagging of the tape therein, in operation: the gap may for instance be on the same order as the inter-feature distance.

Figure 6A:
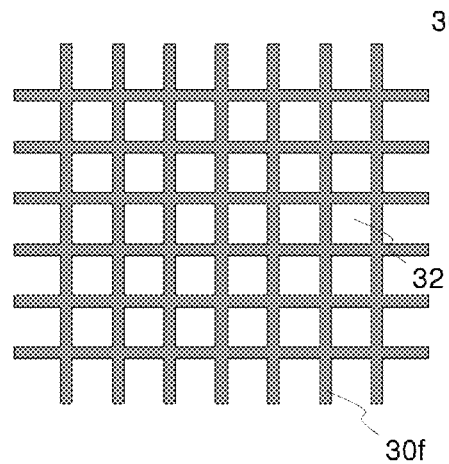
Figure 6B:
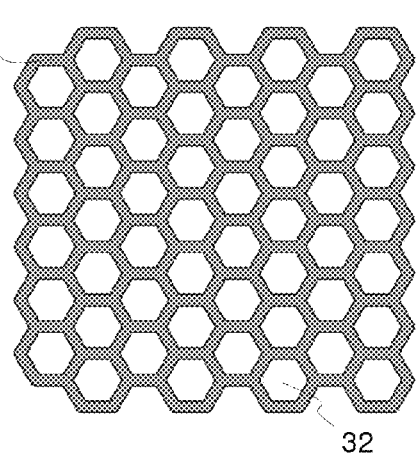

The features 30 are mostly referred to as "bumps" below, except for embodiments such as depicted in FIGS. 6A-6B, where the topographic features are connected to form empty cells. It can nevertheless be appreciated that some aspects of the (laterally unconnected) bumps may apply to the connected features (defining unconnected empty cells) as well, starting with materials, heights, density, etc.

This solution enables the use of very smooth media, i.e., it makes it possible to minimize the transducer-media spacing while minimizing friction/stiction, by controlling the structured area. The area of contact is limited to the bumps 30, which typically occupies a small fraction of the contact area. The bumps 30 accordingly reduce the area of contact between tape 10 and the head surface, the tape stiffness preventing deformation around and about the bumps. The average inter-bump distance can be tuned such that the tape, which usually is stiff enough, does not critically bend or sag into contact with the head between the bumps, see e.g., FIG. 2.

Moreover, an array of protruding features 30 is more regular, more isotropic in-plane, and more controllable from a fabrication point of view than what is obtained by merely roughening the tape head surface around read/write elements. The results obtained with regular arrays of protruding features were found much more convincing than those obtained with roughened areas, be it in terms of friction. Indeed, some prior art solutions use surface roughness to reduce the contact area and hence to reduce friction. However, it has been recognized herein that this approach suffers from wear of the surface due to contact with the tape which tends to make the surface increasingly smooth over time and hence results in a steady increase in friction. Instead, embodiments of the present invention propose to pattern regions of the tape-bearing surface with well-defined, periodically-spaced features that reduce contact area, yet in a regular fashion, and hence friction.

Referring now more specifically to FIGS. 5, 6: in embodiments, the cross-sectional ratio (i.e., the ratio of an average sectional area of a bump to the area of a primitive cell of the periodic array) is preferably less than 20%, as illustrated in the appended drawings, whereby substantial improvements can be seen in terms of friction. Yet, as realized herein, the present concept allows for drastically reducing this ratio, e.g., down to less than 1%, and even less than 0.1%. Indeed, an advantage of using a regular array of protruding features is that one can controllably reduce the area of contact to a very small proportion, as opposed to roughened area. In contrast to roughening the surface, a regular array of protruding features allows the features to be much higher and this, systematically. In turn, this allows for the bumps to be spaced further apart than protruding features of a roughened surface, resulting in less contact area but maintaining a well-controlled tape-head spacing. By decreasing the contact area down to 1 or even 0.1%, or less, one drastically decreases the friction with the tape. The minimal contact area achievable is defined primarily by the process used for fabricating the bumps, the material used for the latter, and also by the stiffness of the tape. Some trial-and-error optimization may be beneficial.

The bumps 30 may have, on average, a protruding height that is between 10 and 1000 nm. The height of the features 30 is typically on the same order as the height at the transducer region. The larger the height, the longer the features can resist wearing. On the other hand, large features may be more difficult to fabricate and more fragile, and may no longer preserve the low-pressure region underneath the tape. A good trade-off discovered herein is to provide a height that, on average, is between 100 and 500 nm. The bumps may have, on average, a cross-sectional area (average) diameter that is between 100 and 5000 nm. Here again, a satisfactory trade-off can be obtained, in terms of ease of fabrication vs. density of bumps, leading to cross-sectional area diameters between 200 and 1000 nm. The average distance between the bumps is typically between 1 and 20 μm, but preferably between 2 and 10 micrometers. A long-range order is present: a structured area typically comprises $10^n$ topographic features (or features that altogether define a primitive cell), where n∈[1-6], though preferably n would be in the range n∈[3-5] for the closest structured areas 50. A typical offset between the height of features 30 and the height of the transducers is on the order of tens of nanometers, such that the effective tape-bearing surface (as felt by the tape) is flat.

In general, the preferred dimensions of and distance between the bumps also depend on the tape characteristics. The average distance between bumps may notably depend on the stiffness of the tape; a thinner tape will require more closely spaced bumps. These dimensions are further constrained by the fabrication processes. The above dimensions reflect good compromises that have been achieved by the present inventors, after intensive experimental works. In this respect, of particular advantage is to have an average distance between the bumps that is between 2 and 10 micrometers, while the superficial ratio is less than 10%, according to tests performed by the inventors. Examples of superficial ratios are given in the table below:

TABLE I

Examples of advantageous ratios of average sectional area of a topographic feature to area of primitive cell of periodic array assuming a 2D square lattice, in percent, as obtained for selected average diameter values (for the bumps) vs. average inter-bump (first-neighbor) distances.

| | distance (all in μm) | | | | | |
|---|---|---|---|---|---|---|
| Diameter | 1 | 2 | 5 | 10 | 15 | 20 |
| 0.1 | 0.785 | 0.196 | 0.031 | 0.008 | 0.003 | — |
| 0.2 | 3.142 | 0.785 | 0.126 | 0.031 | 0.014 | — |
| 0.5 | 19.635 | 4.909 | 0.785 | 0.196 | 0.087 | 0.049 |
| 0.75 | — | 11.045 | 1.767 | 0.442 | 0.196 | 0.110 |
| 1 | — | 19.635 | 3.142 | 0.785 | 0.349 | 0.196 |
| 2 | — | — | 12.566 | 3.142 | 1.396 | 0.785 |
| 5 | — | — | — | 19.635 | 8.727 | 4.909 |

Any of the diameter values listed above from 0.1 to 2 microns may define a lower bound of a preferred interval, while any larger value listed above (from 0.2 to 5 microns) may define an upper bound of a preferred interval. Similarly, any of the inter-feature distances listed above (from 1 to 15 microns) may define a lower bound of a preferred interval, and any larger value (from 2 to 20 microns) may define an upper bound of a preferred interval. Embodiments not tested or found less satisfactory are not reported in the table.

In terms of ease of fabrication, it is preferred to fabricate features (bumps) that have an average diameter larger than 1 μm, though it is possible to obtain average diameters between 0.1 and 1.0 μm. In terms of friction, some improvements can already be seen for area ratios less than 50%. These become, however, more convincing for area ratios below 20%. As noted earlier, the present solution allow for achieving very small ratios, e.g., less than 1% or, even, less than 0.1%, which ratios definitely improve sliding performances. Of course, this kind of appreciation is relative as it depends on the smoothness of the tape. Finally, in terms of sagging, and depending on the tape quality, one may contemplate inter-feature distances of more than 15 μm in some cases. However, more systematical implementations are possible below 15 μm and performances are definitely better below 5 μm. More generally, the lower the distance, the better the performances in terms of sagging.

In reference to FIG. 3, the tape-bearing surface 21 of a tape head 1a may be formed by one or more layers 22 of material deposited conformal to features 31, to form the bumps 30. This allows for optimizing the material meant to come in contact with the tape. Layers 22 may notably comprise one or more of the following materials: FeN, TiN, SiN, diamond-like carbon and aluminum oxide. Preferred materials should be conductive to prevent tribocharging. TiN is a good candidate, because it is non-magnetic (FeN is), and it is further conductive and wear resistant.

FIG. 4 shows several possible bump profiles 30a-d. Preferably though, at least a subset of the bumps have an essentially constant cross-section along their height, e.g., a rectangular profile, as shown in FIG. 3. Accordingly, the contact area remains essentially constant even if worn, at variance with solutions based on surface roughness. An essentially constant cross-section typically means less than 25% of mean deviation here. The exact profile of the features 30 shall depend on the fabrication method used. Still, the bumps 30 should preferably try to approximate a rectangular profile, as possible. Now, due to the tape bending stiffness, rounding of the shape on the upper surface does not necessarily decrease its effectiveness.

The bumps may, for example, be made of an $Al_2O_3$—TiC composite (or AlTiC), TiN, or FeN. The head may for instance be essentially made of AlTiC, with the cells etched in the AlTiC material.

Referring now to FIGS. 7-12, the tape heads 1c-1h depicted have tape-bearing surfaces that comprise at least two structured areas 52l, 50u, 52r, 50d (but possibly more) adjacent a transducer area 44 (which comprises at least one transducer 40). Structured areas are indicated by hatched rectangles in some cases (FIGS. 7-10), for clarity. Each structured area exhibits a periodic array of bumps: a first area 52l, 50u is opposite to a second area 52r, 50d with respect to an area comprising one or more transducers, like area 44, along direction x and/or z.

In FIGS. 7 and 9-12, the region 24 (elongated rectangle) denotes a region between two pieces (e.g., AlTiC) of the head. This region 24 typically comprises essentially an oxide, but also a stack of materials that form the read/write elements. The head shown in FIG. 8 is a servo format head, which does not typically comprise such an oxide 24. This region is typically 30 μm wide (in the z direction), with its dimensions being deliberately exaggerated in the appended drawings. Thus, no protruding feature is typically provided in this region 24.

Figure 7:
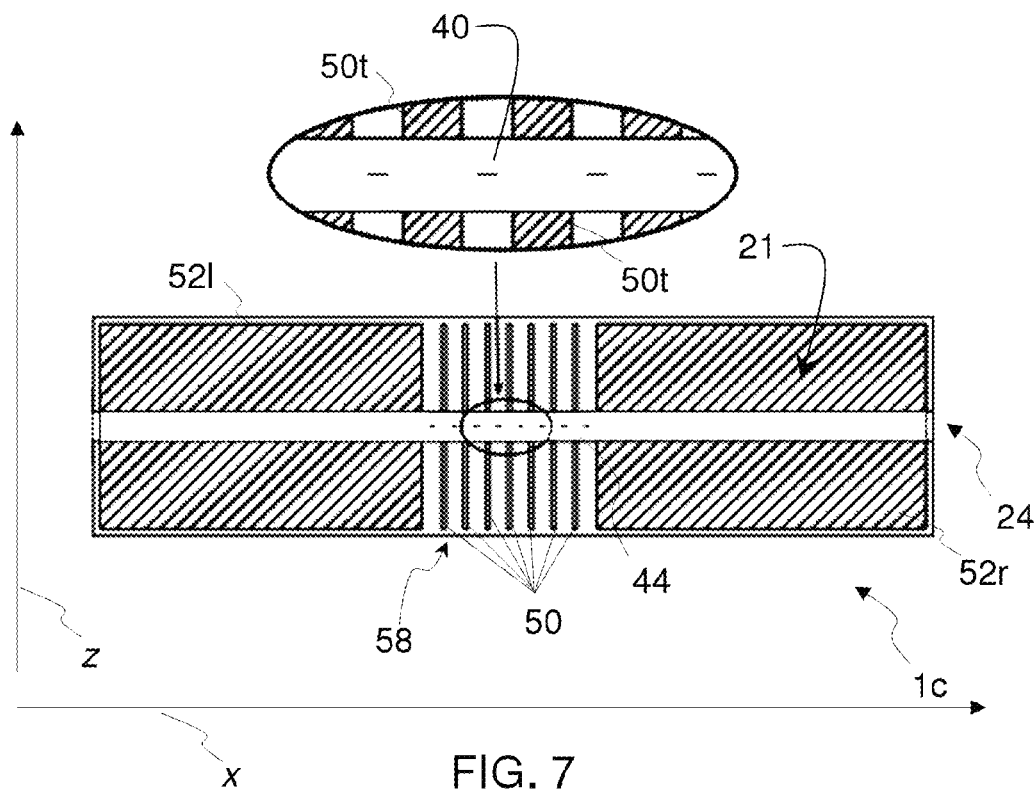
Figure 8:
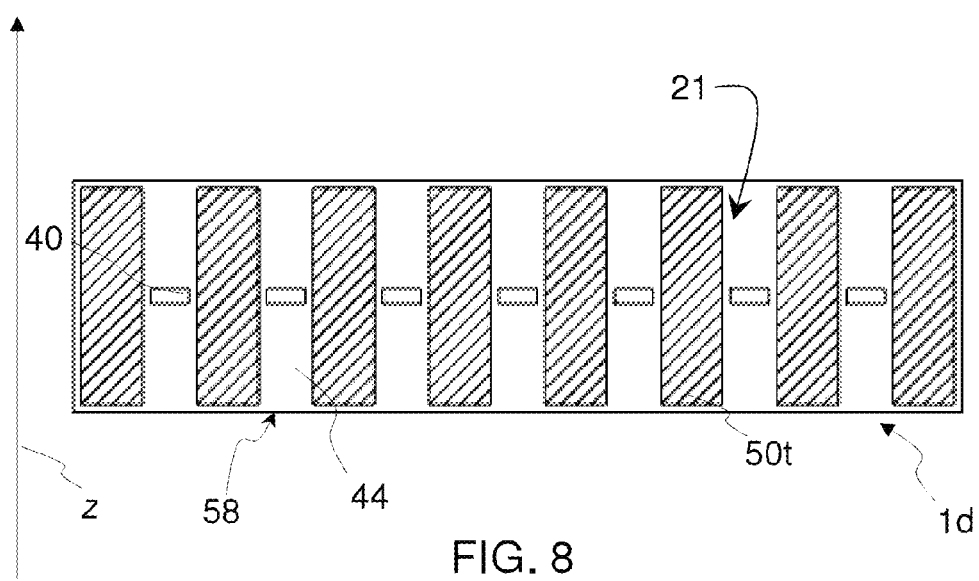

FIG. 7 represents a configuration suited for a data read/write head, where two large areas 52l, 52r are distributed on each side of the transducer area 44, along direction x (transverse to the direction z of circulation of the tape), while transducers 40 are, each, separated by narrower areas 50t extending through the area 44 along z.

FIG. 8 corresponds to a configuration best suited for a servo formatter head with relatively large spacing between the write elements 40; here again structured areas 50t extend through the area 44 along z.

Exemplary preferred dimensions for the various areas 44, 50, 52 involved may be the following:
44: 30 μm×3000 μm;
50t: 400 μm×100 μm;
52l: 400 μm×10000 μm; and
50u, 50d: 200 μm×3000 μm.

Figure 9:
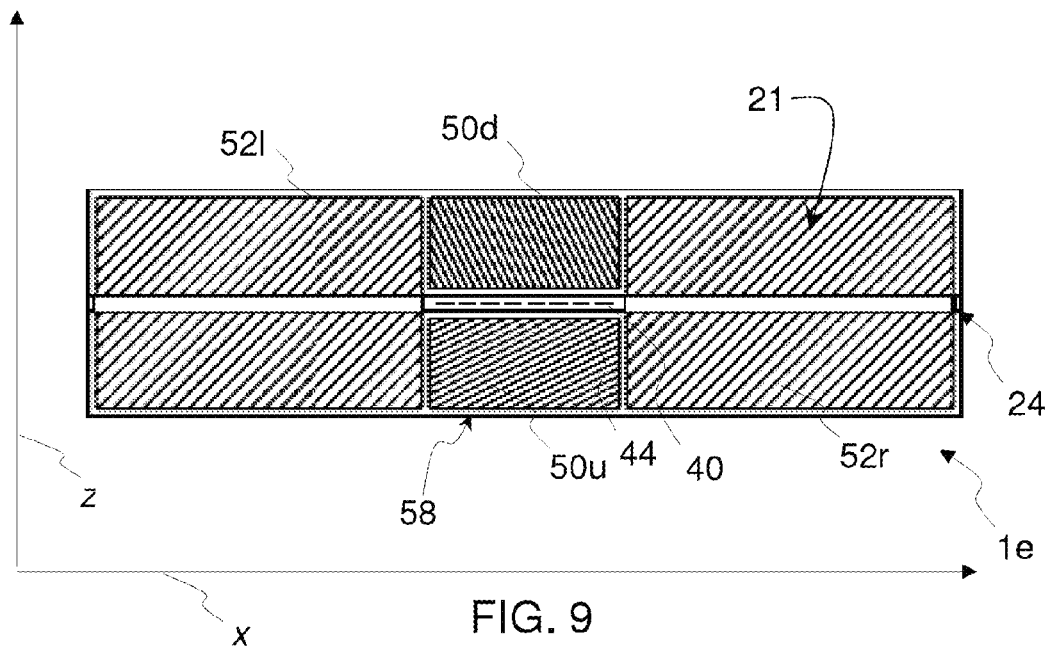

As seen in FIG. 9, two structured areas 50u, 50d may notably be provided about transducers 40, up- and downstream of the read/write elements 40, i.e., along direction z. FIG. 9 shows a configuration suited for data read/write heads. Additional areas are provided in the transverse direction x, the patterning may differ between regions.

Figure 10:
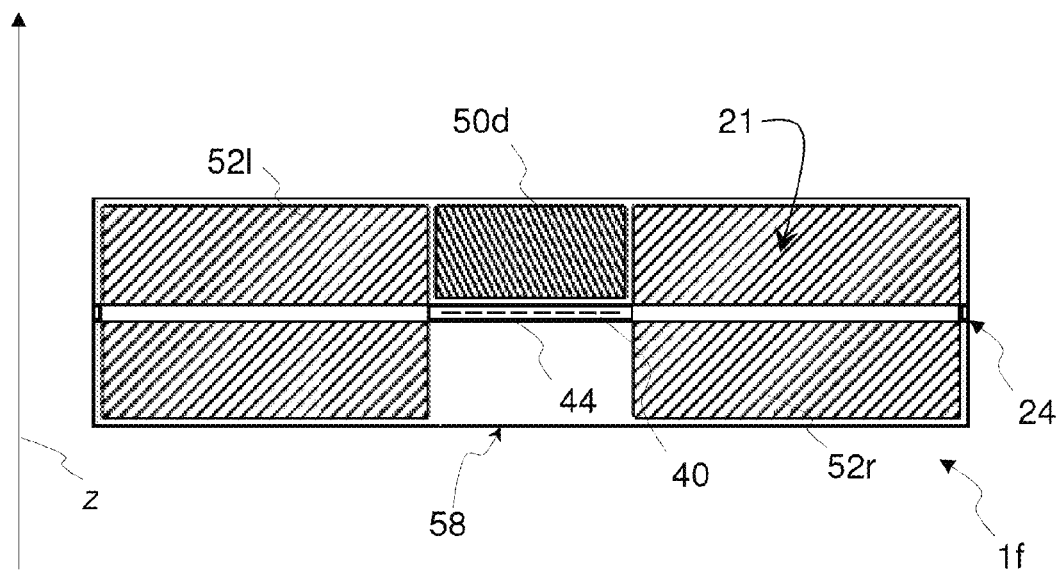

In other embodiments, the head may be asymmetric along z: in the example of FIG. 10, the tape head 1f exhibits only one structured area 50d along z. I.e., the structured area 50d is adjacent to and on one side only of the transducer area 44 along the direction z, i.e., no such structured area is provided opposite to structured area 50d with respect to the transducer area 44. The structured area 50d can for instance be located downstream the transducers with respect to a tape direction. This way, the head-tape spacing is not disturbed by the bumps before it sees a transducer. In alternative embodiments, a structured area could be provided opposite to area 50d, but with a different pattern, e.g., having denser features. Note that, in the example of FIG. 10, additional structured areas 52l, 52r are provided adjacent the transducer area 44.

More generally, various arrangements of structured areas are possible, as illustrated in FIGS. 7, 9, 11, 12. In each of these examples, the tape heads 1c-h exhibit at least four structured areas 52l, 50u; 52r, 50d, each being adjacent to an area surrounding a transducer (or even an area 44 that comprises several transducers). A first area 50u can be placed opposite to a second one 50d, upstream and downstream of a transducer, with respect to direction z. Two additional areas 52l, 52r may be placed, opposite to each other, on each side of a transducer, along lateral direction x.

In FIG. 11, regions 50u, 50d up- and downstream of the readers/writers 40 have been compartmentalized by barriers, or walls. Namely, the topographic features are arranged in one or more compartments 50u, 50d each of the compartments being enclosed (at least partly) by barriers 60 on the tape-bearing surface 21. The barriers form ridges which prevent air from bleeding into the low pressure regions. In FIG. 11, areas 50u, 50d (along z) correspond to respective compartments delimited by barriers 60. The area 44 can be regarded as forming a wide part of a wall enclosing a contiguous compartment 50u, 50d, because it is typically at the same height as the topographic features in the compartments.

Referring back to FIGS. 6A-6B, the topographic features 30f, 30g are connected, in such a way as to define unconnected empty cells 32, e.g., to form a honeycomb structure (FIG. 6B). FIGS. 6A-6B are two examples of periodic patterns that feature individual unconnected holes, e.g., that have been etched in the surface. The gray parts of the patterns protrude. Such patterns reduce contact area while preventing air from bleeding in from the sides. Thus, such variants too allow for preventing air from bleeding into low pressure regions.

Figure 12D:
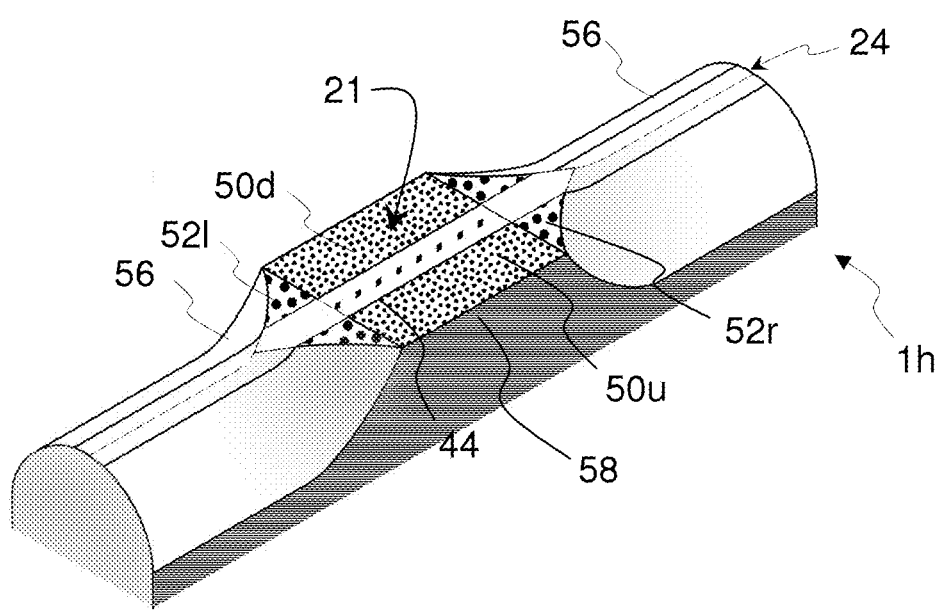
FIG. 12D is a simplified 3D view of the head of FIGS. 12A, 12B and 12C.

In each of the examples of FIGS. 11 and 12, the tape-bearing surface exhibits at least two distinct periodic arrays of bumps. A first array 50u or 50d comprises a first set of topographic features. A second array 52l or 52r which is farther from the transducer area 44 than the first array, comprises a second set of bumps. The first and second sets of bumps are configured such as to allow for a tape to get closer to the first array than to the second array, in operation. To that aim, features 30 in the first array can be made shorter, and/or the ratio of sectional areas of features to the area of primitive cells of the first array can be increased. More generally, the first and second arrays can differ in many respects: dimensions (notably the height) of the protruding features, distance therebetween, patterns, etc., see FIG. 11 or 12. This way, less friction can be achieved in the second array, where the tape-head distance is less important.

Referring now more specifically to FIG. 12, the tape head 1$h$ here has a tape-bearing surface 21 defined by a flat protruding so as to come closer to the tape than adjacent regions 56. The flat is composed of regions 50$u$, 50$d$, 52$l$, 52$r$ and the central portion of the region 24. The head may further comprise beveled and/or chamfered regions 56, in the vicinity of the flat. There is preferably no skiving edge in front of the beveled regions 56 and thus the tape is not in hard contact there. There is an air bearing above the beveled region, and hence no friction in that region.

Concerning now the fabrication: preferably, the side walls of the topographic features 30 are perpendicular or near perpendicular to the tape bearing surface 21. Because of tape bending stiffness, rounding of the shape does not necessarily increase the area of contact. Therefore, rounding is permissible and will not necessarily decrease the effectiveness of the patterning. The bumps can be fabricated by wet or dry etching or deposition. The pattern and location of the topographic features 30 can be lithographically defined. Standard lithography can be used for micron-sized topographic features. More advanced lithography/fabrication techniques can be used for sub-micron sized features, e.g., imprint lithography, colloidal lithography, corner-lithography, or standard lithography combined with a shrinking operation.

Finally, as an alternative to skiving edges, actuators may be relied upon, as described earlier. Because a tape is a very thin and flexible medium, one cannot simply push or urge a tape head towards the tape to reduce the air bearing, in the same way as for HDDs. One may instead contemplate using electrostatic elements to urge or pull the magnetic tape towards the head and thus reduce the thickness of the air bearing. Unfortunately, the electrostatic force increases as the distance between the two electrodes i.e., the tape and the head decreases. As a result, and at least for some types of heads and tapes, one observes a tendency for the tape to jump into contact with the head, as tests performed by the present inventors have shown.

A solution to this additional problem is to use a specific type of proximity sensor. More precisely, a tape-head distance sensor circuit may be relied upon, which dynamically senses the tape-head distance as an active feedback to alter, as necessary, and thereby control the tape-head distance. Now, to implement such a feedback system in practice, a sensor capable of measuring the ever-changing tape-head distance is needed. Usual proximity sensors are known to be based on capacitive effect, Doppler effect, inductive effect, laser rangefinder, passive optical, passive thermal infrared, photocell, etc. However, none of these devices are suited to the present context. Therefore, it is proposed to use a non-passive thermal sensor, in order to sense the tape-head distance. This sensor is not a passive sensor inasmuch as it does not rely on thermal energy given off by the tape. Rather, the sensor involved senses the heat dissipated by the moving tape, at the level of the tape bearing surface. To that aim, the tape bearing surface needs be suitably shaped.

More precisely, the tape bearing surface may be shaped such as to form an air bearing 40 when moving the tape with respect to the surface, in operation. This air bearing plays two roles. First, it gives some room, i.e., a gap, to allow for altering the tape-head distance. More precisely, the air bearing plays the role of a deformable media, a "spring" against which the tape can be urged. Second, when streaming the tape over the surface, the air flow that it creates may slightly contribute to dissipate heat at the surface. However, this is mainly the tape that dissipates the heat as the tape can come very close to the head. Thus, temperature sensing is very sensitive to changes in the tape-head distance. As the tape gets closer to the surface, it gradually changes the temperature at the surface. This change can be sensed by the thermal sensor circuit. As the latter senses heat dissipated at the surface, it can thereby sense the tape-to-head distance, which varies correlatively. Finally, tape-head distance control means, which are connected to the sensor circuit, are configured to alter the tape-head distance according to a signal received from the sensor circuit.

A suitable method of tape-head distance control may include:

circulating the tape with respect to the tape head, i.e., streaming the tape over the tape bearing surface to form the air bearing between the tape and the surface;

sensing (via the thermal sensor circuit) the distance between the tape bearing surface and the tape moving with respect to the tape bearing surface; and altering the distance according to a signal received from the sensor circuit. The steps of altering and sensing are performed correlatively, while streaming the tape. Still, the circuits could be started before starting to stream the tape, or even, after a delay after starting to stream the tape, e.g., to operate in normal streaming conditions or on the contrary to operate only in specific conditions.

Tape-head distance control can accordingly be achieved, which allows for using smoother tape, yet without increasing the friction. This leads to a significantly reduced tape-head spacing which in turn allows for increasing the linear density. This, in addition to the topographic features, contributes to reduce the contact force between the tape and head, thereby reducing head wear significantly and, in turn, is beneficial in terms of lifetime of the head and the media.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other crystallographic patterns and/or dimensions may be given to the structured areas (comprising the topographic features 30), with various possible degrees of sophistication as to the compartmentalization of the areas.

REFERENCE LIST 1, 1a-1h Tape head
10 Magnetic tape
21 Tape-bearing surface
44 Transducer area
40, 42 Transducer
50, 50u, 50d, 52l, 52r Structured area
30, 30a-30g Topographic features
z Longitudinal direction of circulation of a tape
50u, 50d, 52l, 52r Compartments
60 Enclosing barriers
32 Unconnected empty cells
56 Beveled regions
52l, 52r Chamfered regions
58 Skiving edges

The invention claimed is:

1. A tape head, adapted for reading and/or writing to a magnetic tape, the tape head having a tape-bearing surface and being configured to urge a magnetic tape against the bearing surface, wherein the bearing surface comprises:
a transducer area, comprising at least one transducer that is at least one of a read element and a write element, designed for at least one of reading from and writing to a magnetic tape; and
a structured area adjacent to the transducer area, comprising at least two distinct periodic arrays of topographic features on the tape-bearing surface, wherein a first array comprises a first set of topographic features, and a second array that is farther from the transducer area than the first array comprises a second set of topographic features, the first and second sets of topographic features being configured to allow for a tape to get closer to the first array than to the second array, the topographic features configured within the structured area to determine a minimal distance between the transducer area and a tape.

2. The tape head of claim 1, wherein a ratio of an average sectional area of one of the topographic features to the area of a primitive cell of the periodic array is less than 20%.

3. The tape head of claim 1, wherein a ratio of an average sectional area of one of the topographic features to the area of a primitive cell of the periodic array is less than 1%.

4. The tape head of claim 1, wherein a ratio of an average sectional area of one of the topographic features to the area of a primitive cell of the periodic array is less than 0.1%.

5. The tape head of claim 1, wherein the topographic features have, on average, a protruding height between about 10 and 1000 nm.

6. The tape head of claim 1, wherein the topographic features have, on average, a cross-sectional area diameter between about 100 and 5000 nm.

7. The tape head of claim 1, wherein an average distance between the topographic features is between about 1 and 20 micrometers.

8. The tape head of claim 1, wherein the tape-bearing surface comprises one or more layers of material deposited on top of features, conformal thereto, to form the topographic features, the one or more layers comprising one or more of: FeN, TiN, SiN, diamond-like carbon and aluminum oxide.

9. The tape head of claim 1, wherein at least a subset of the topographic features have a substantially constant cross-section along a height thereof.

10. The tape head of claim 1, wherein the topographic features comprise one or more of: TiN, $Al_2O_3$—TiC, and FeN.

11. The tape head of claim 1, wherein topographic features in the structured area are arranged in one or more compartments, each of the compartments comprising an array of topographic features and being enclosed, at least partly, by barriers on the tape-bearing surface.

12. The tape head of claim 1, wherein the topographic features are connected, defining unconnected empty cells therein, so as to form a honeycomb structure.

13. The tape head of claim 1, wherein the tape-bearing surface is defined by a flat protruding from a side of the tape-bearing surface so as to come closer to a tape than regions adjacent to the flat, and wherein the head comprises, on the same side and in the vicinity of the flat, one or more of beveled and chamfered regions.

* * * * *